US 6,582,003 B2

(12) United States Patent
Fourrey et al.

(10) Patent No.: US 6,582,003 B2
(45) Date of Patent: Jun. 24, 2003

(54) MODULAR SEAT LAYOUT SYSTEM FOR AN AUTOMOBILE VEHICLE, ESPECIALLY FOR THE SEATS OF THE FIRST AND SECOND ROWS

(75) Inventors: François Fourrey, Corquilleroy (FR); Jean-François Pierrey, Bourg la Reine (FR); François Senseby, Chatenay-Malabry (FR); Frédéric Baret, Dourdan (FR)

(73) Assignee: Aurecia Sieges d'Automobile S.A., Boulogne Cedex (FR)

( * ) Notice: Subject to any disclaimer, the term of this patent is extended or adjusted under 35 U.S.C. 154(b) by 107 days.

(21) Appl. No.: 09/780,624

(22) Filed: Feb. 12, 2001

(65) Prior Publication Data

US 2001/0050502 A1 Dec. 13, 2001

(30) Foreign Application Priority Data

Feb. 10, 2000 (FR) .............................. 00 01631

(51) Int. Cl.⁷ ................................................ B60N 2/01
(52) U.S. Cl. ...................................... 296/64; 296/65.09
(58) Field of Search ....................... 296/63, 64, 65.01, 296/65.05, 65.09, 65.13, 65.16, 66, 69; 297/234, 232, 236, 1, 34, 235, 326, 325, 329, 334, 344.1, 378.1

(56) References Cited

U.S. PATENT DOCUMENTS 2,926,951 A  3/1960  Koplin
4,227,736 A * 10/1980 Lebault et al. ............ 296/65.09
4,669,780 A *  6/1987 Sakakibara et al. ............ 296/64
5,605,368 A   2/1997 Noma et al.
5,954,398 A   9/1999 Namba et al.
6,000,742 A * 12/1999 Schaefer et al. ......... 296/65.09
6,135,558 A * 10/2000 Behrens et al. .......... 296/65.09
6,293,603 B1 * 9/2001 Waku et al. .............. 296/65.05
2001/0001526 A1 * 5/2001 Moon et al. ......... 296/65.09 X

FOREIGN PATENT DOCUMENTS

| DE | 198 11 190 | 9/1999 |
| EP | 0899152 A2 * | 3/1999 |
| FR | 1522571 | 4/1968 |
| FR | 2589800 | 5/1987 |
| GB | 1001435 | 8/1965 |

* cited by examiner

Primary Examiner—D. Glenn Dayoan
Assistant Examiner—Jason Morrow
(74) Attorney, Agent, or Firm—Connolly Bove Lodge & Hutz LLP

(57) ABSTRACT

A modular seat layout system in an automobile vehicle that includes at last two seats located one behind the other. The front seat is attached to the floor of the vehicle by a first set of hinged items so that the seat pan of the front seat can translate forward to be housed in the space existing in front of the front seat when it is in the normal utilization position. The backrest of the front seat extends more or less horizontally towards the rear from the seat pan at the location that the seat pan occupies in the normal utilization position. The rear seat is attached to the floor by a second of hinged items so that the rear seat can be folded and placed against the backrest of the front seat.

10 Claims, 4 Drawing Sheets

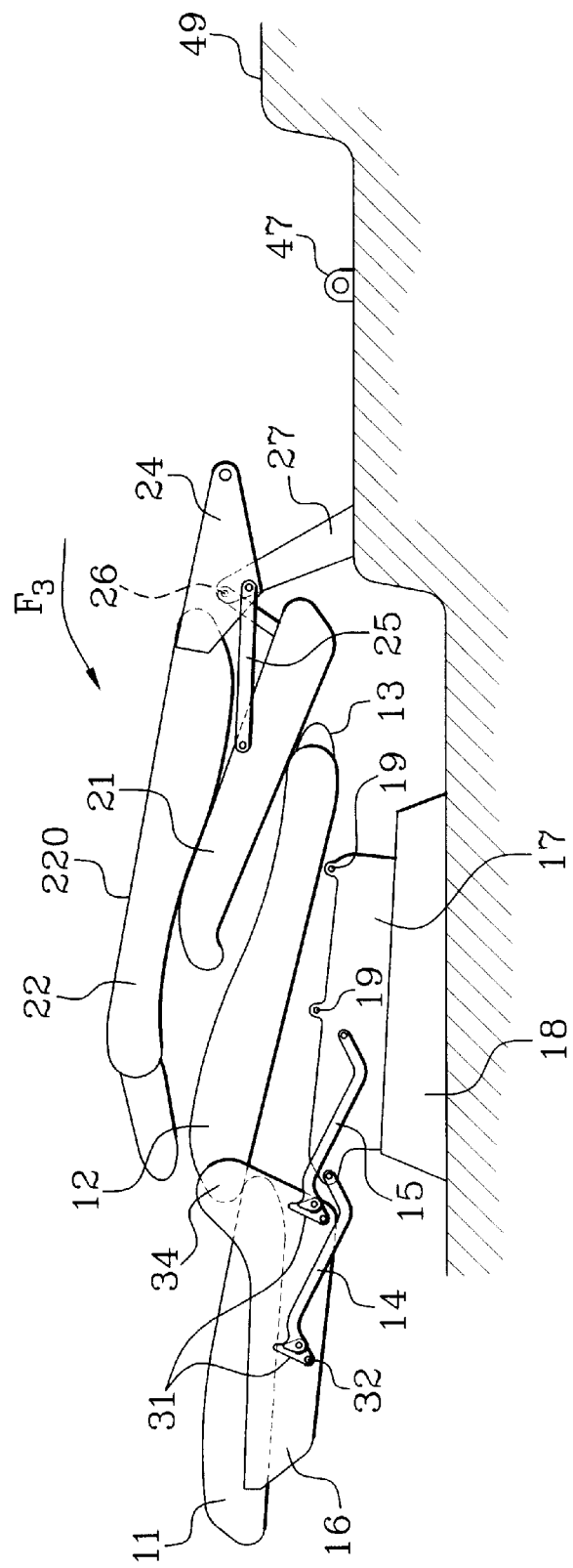

Figure 1:
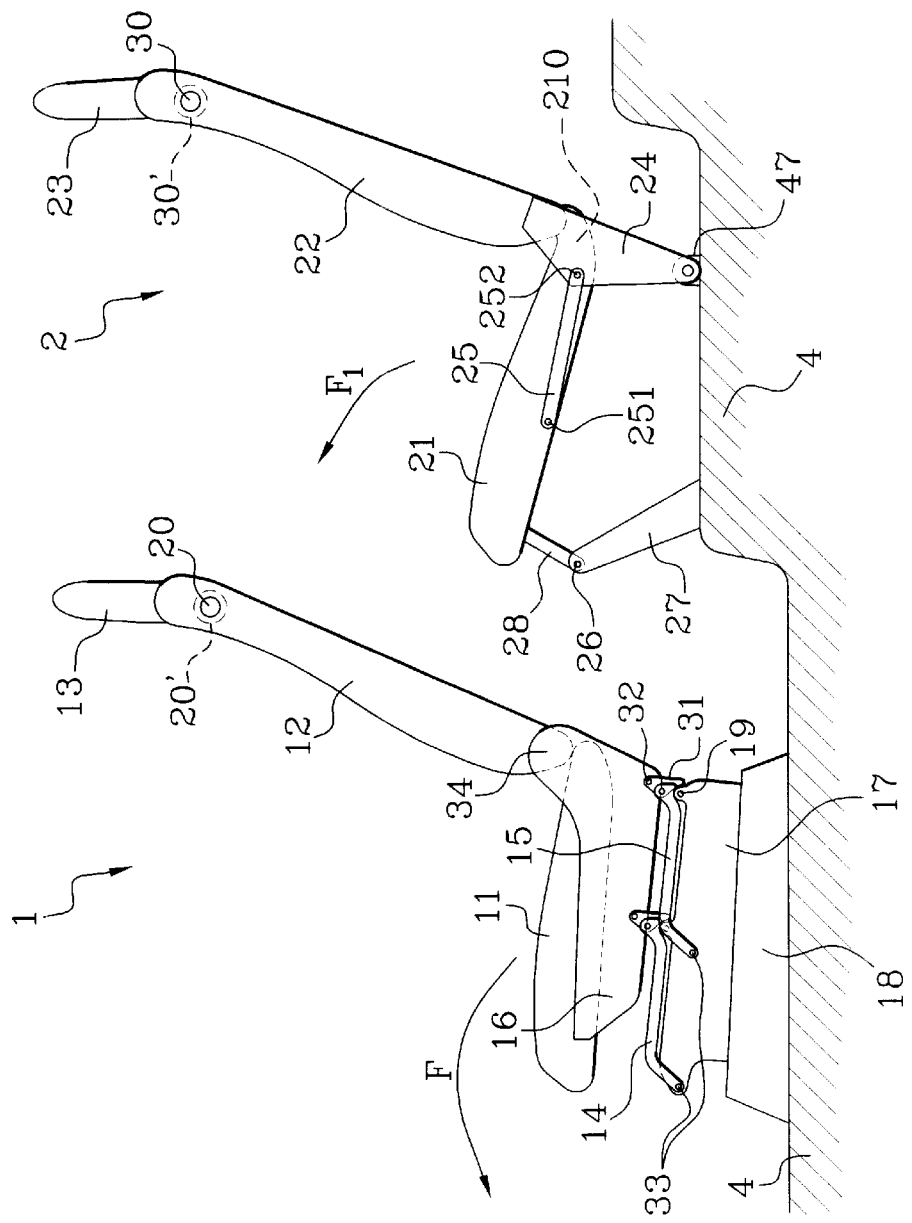

MODULAR SEAT LAYOUT SYSTEM FOR AN AUTOMOBILE VEHICLE, ESPECIALLY FOR THE SEATS OF THE FIRST AND SECOND ROWS

This invention concerns a modular seat layout system for an automobile vehicle, this system concerning seats placed one behind each other in the normal utilisation position of the said seats. The invention applies especially but not exclusively to a seat of the second row located behind the front passenger seat in a conventional car.

Maximum modularity is increasingly sought in the layout of the seats in vehicles so that they can be arranged to provide maximum comfort for the users and, especially, to be able to obtain maximum load-carrying space if all seats are not used. To meet these expectations, a well-known solution consists in using removable seats, at least in part, which can be removed from the passenger compartment upon request to increase the load-carrying volume. A disadvantage is that the seat thus removed must be stored and therefore requires a place for this purpose, for instance in the vehicle owner's garage. In addition, it is in general necessary to return to the place where the seat was removed to be able to reinstall it and again provide a seat for a passenger.

For various types of vehicles, it has already been proposed to attach the seats to the vehicle whilst allowing maximum load-carrying space to be freed without the need to remove the seat from the passenger compartment. Various solutions are currently used in conventional-type saloon cars which consist, in general, in folding the rear seat, either in full or only over a part of its width, against the rear of the backrest of the front seats. Often, for instance, the seat pan of the rear seat is raised towards the front seat and the rear backrest is folded down against the floor to take the place of the seat pan. The volume of the boot is thus considerably increased and the rear face of the backrest thus folded down extends the load-carrying floor space of the boot.

Document EP 0899152 shows another system where the seat pan is turned over remaining more or less in its normal utilisation position and the backrest is also placed rear face upwards extending towards the front the seat pan thus turned over. The lower face of the seat pan which is then facing upwards and the rear face of the backrest then form together a usable load-carrying floor extending from the boot of the vehicle.

In yet other systems, such as, for instance, the one described in document FR-A-2589800, the seat pan is raised as described above and the rear backrest, hinged on the seat pan, is also placed, resting more or less vertically, behind the raised seat pan and the front seat. The seat displacement kinematics are obtained by a set of hinged links connecting the floor of the vehicle, the seat pan and the backrest of the seat. In this system, with the seat pan in normal utilisation position, the backrest of the rear seat can also be pivoted towards the rear to a more or less horizontal position to form, with the seat pan, a bunk.

Moreover, vehicle front seats where the backrest folds forwards are also known, for instance, to facilitate access to the rear seats in vehicles with a single passenger door. But even when using this possibility of tilting the backrest of the front seat in combination with the folding of the rear seat as described above, the additional gain in load carrying volume remains low as the travel of the backrest remains limited and the overall size of the front seat remains high.

The aim of this invention is to propose another solution for the layout of the seats in the passenger compartment of a car which allows the load-carrying space to be modulated as best as possible to suit requirements without the need to remove the seats from the passenger compartment. The invention aims also in conserving maximum utilisation possibility of the seats by keeping them attached to the vehicle and therefore liable to be returned to normal utilisation position as soon as the unloading of the boot permits this. The invention also aims in getting best use out of all the space available in the vehicle when there is no passenger in the front seat. Lastly, the invention also aims at allowing these changes in layout to be made by simple operations.

With these targets in mind, the subject of the invention is a modular seat layout system in an automobile vehicle including at least two seats located one behind each other, that is one seat that will be designated the front seat and the other seat that will be designated the rear seat.

According to the invention, this system is characterised in that the front seat is attached to the floor of the vehicle by a first set of hinged items so that the seat pan of the front seat can be translated towards the front to be housed, in a forward position, in the space existing in front of the front seat when it is in normal utilisation position with the backrest extending more or less horizontally towards the rear from the seat pan, more or less at the location that the said seat pan occupies in normal utilisation position, and the rear seat is connected to the floor by a second set of hinged items so that the said rear seat can be folded and placed against the backrest of the front seat.

The designations front and rear are relative when applied to the two seats mentioned in the definition of the invention above. In a saloon car with two rows of seats, these are mainly the front passenger seat and the rear seat located behind the passenger seat, but the invention could also apply, for instance, to the seats of the second and third rows in a vehicle with three rows of seats.

The system according to the invention thus allows, thanks to discerning use of the space available in front of the front seat, to minimise the size of the front seat when not used by a passenger and, consequently, to minimise the residual size of the rear seat in the volume of the passenger compartment which can be used to increase the effective load-carrying volume of the boot.

In addition, the invention allows this gain in load-carrying volume to be obtained while conserving all the seats in the passenger compartment and also by conserving the possibility of normal use of the front seat in the case where only the folding of the rear seat on itself, as will be seen later, is sufficient to obtain the required load-carrying volume.

Preferentially, the backrest of the front seat is installed so as to pivot in relation to the seat pan and includes detachable locking means to connect the top of the backrest of the front seat to the body of the vehicle. Thus, the pivoting of the backrest towards the rear can be achieved easily when the locking means are released and these locking means ensure full safety required by preventing all unwanted pivoting of the backrest during the normal use of the seat.

According to a preferential arrangement, the second set of hinged items is arranged so that the seat pan of the rear seat can be raised more or less to the vertical by pivoting forwards and the backrest of the rear seat can be translated to position it behind the thus raised seat pan. Thus, even when the front seat remains in its normal utilisation position, an appreciable gain in load-carrying volume can be obtained by making the space taken up by the rear seat available for this purpose. The rear seat is then folded onto itself and raised behind the backrest of the front seat taking up a volume as small as possible. This then gives maximum boot volume, without removing the seats, only the combined thickness of the raised seat pan and the backrest of the second row seat reduce the length of the boot from the rear of the vehicle up to the seats of the first row.

From the position specified above, where the backrest of the rear seat is placed behind the raised seat pan of the said rear seat, the complete seat thus folded can be folded against the backrest of the front seat, the rear face of the backrest of the rear seat then being more or less horizontal and, preferentially, in a plane close to that of the boot load-carrying floor. Thus, for example, long objects can be placed in the boot of the vehicle, resting at the front on the rear face of the backrest of the rear seat.

To ensure the translation of the seat pan of the front seat to its forward position, the first set of hinged items preferentially includes two arms extending more or less parallel and hinged, on the one hand, in relation to the seat pan and, on the other hand, in relation to a seat base connected to the floor so as to form, with the said seat pan and the said base, a deformable parallelogram. The translation of the seat pan is then made along a trajectory more or less following the arc of a circle which allows the seat pan to be brought to its forward position at the front of the said base and at a level lower than the level of the seat pan in normal utilisation position.

Preferentially, to ensure conventional adjustment of the front seat in the forward-rearward direction, the longitudinal position of the base is adjustable in relation to the floor. In addition, this adjustment can be used, if applicable, to move the complete front seat as far forwards as possible thus freeing more space for folding the rear seat.

The support arms of the seat pan of the front seat are preferentially installed so as to pivot on lugs themselves hinged at one end on the framework of the seat pan and adapted so as to lock by the other end on anchor fittings attached to the base of the seat thus ensuring the link required for the seat in relation to the floor in normal use of the said seat. Also note that the trajectory of the seat pan in the arc of a circle, imparted by the pivoting arms, allows easy disengagement of the lugs from the anchor fittings when they are unlocked by raising the seat pan in relation to the base at the start of its translation movement. In addition, the hinging of the lugs on the seat pan framework allows the seat pan to be lowered still further when it is placed in forward position as will be seen later.

According to other technological arrangements of the design according to the invention, especially adapted to obtain the kinematics required for the various arrangements mentioned above while ensuring simple and rapid operation:
the second set of hinged items, for the rear seat, includes:
a front seat pan support, fixed and attached to the floor, on which the front of the seat pan of the rear seat is hinged,
a rear leg on the upper end of which is installed the backrest of the rear seat, which is attached to the seat pan by a pivoting link hinged on the leg and on the seat pan in the centre longitudinal part of this,
this system allowing the seat pan to be raised simultaneously with the movement of the backrest, therefore requiring a single operation to bring the seat of the second row against the backrest of the seat of the first row.
the system includes disconnectable anchoring means to connect in a separable manner the lower end of the rear leg to the floor of the vehicle to ensure rigid attachment of the rear seat to the floor in all cases where it can accommodate a passenger.
the backrest of the rear seat includes disconnectable locking means to connect the top of the backrest of the rear seat to the body of the vehicle.

Other characteristics and advantages of the invention will appear in the description which will be given of a layout, in compliance with the invention, of the seats of the first and second rows of a car.

Figure 2:
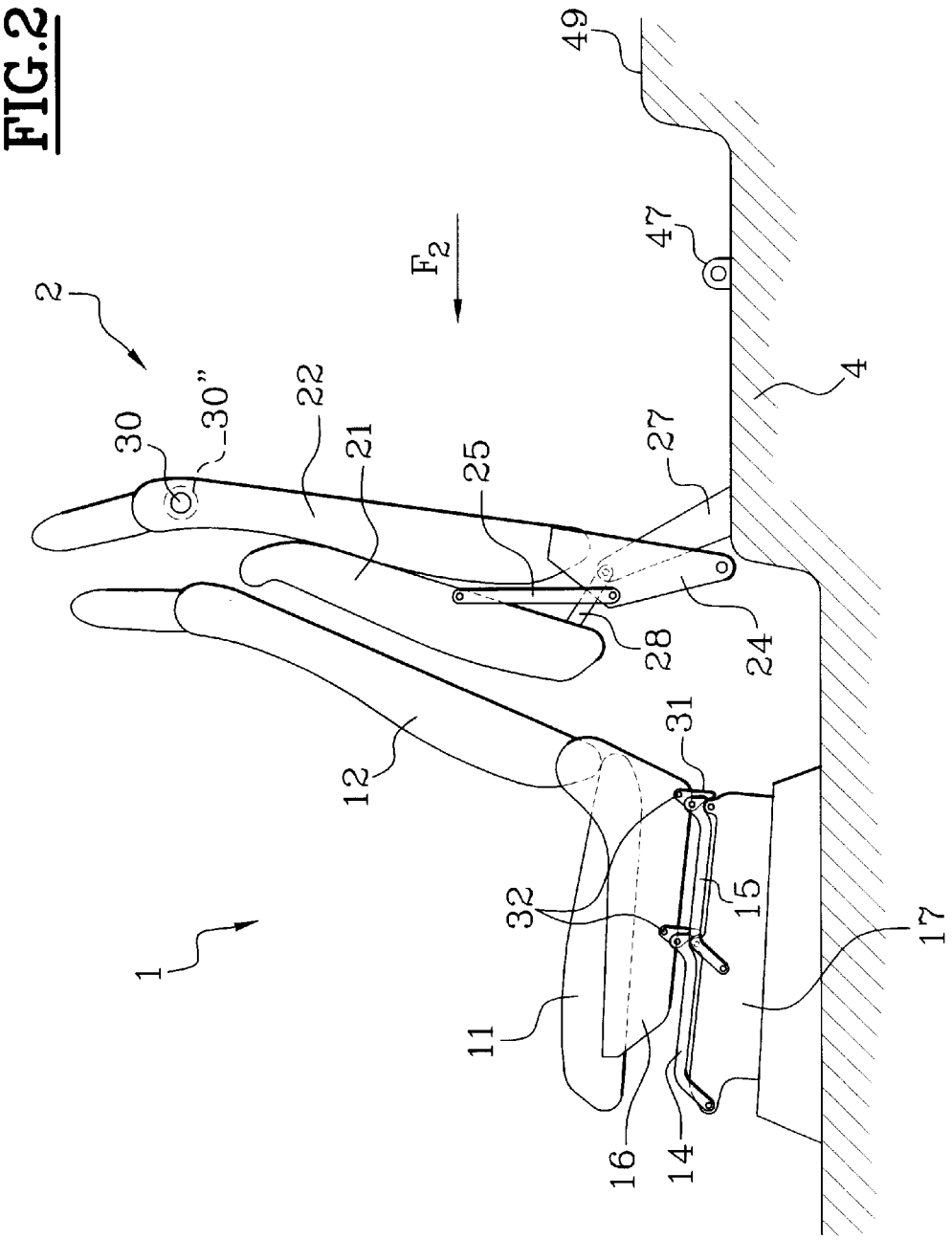
Figure 3:
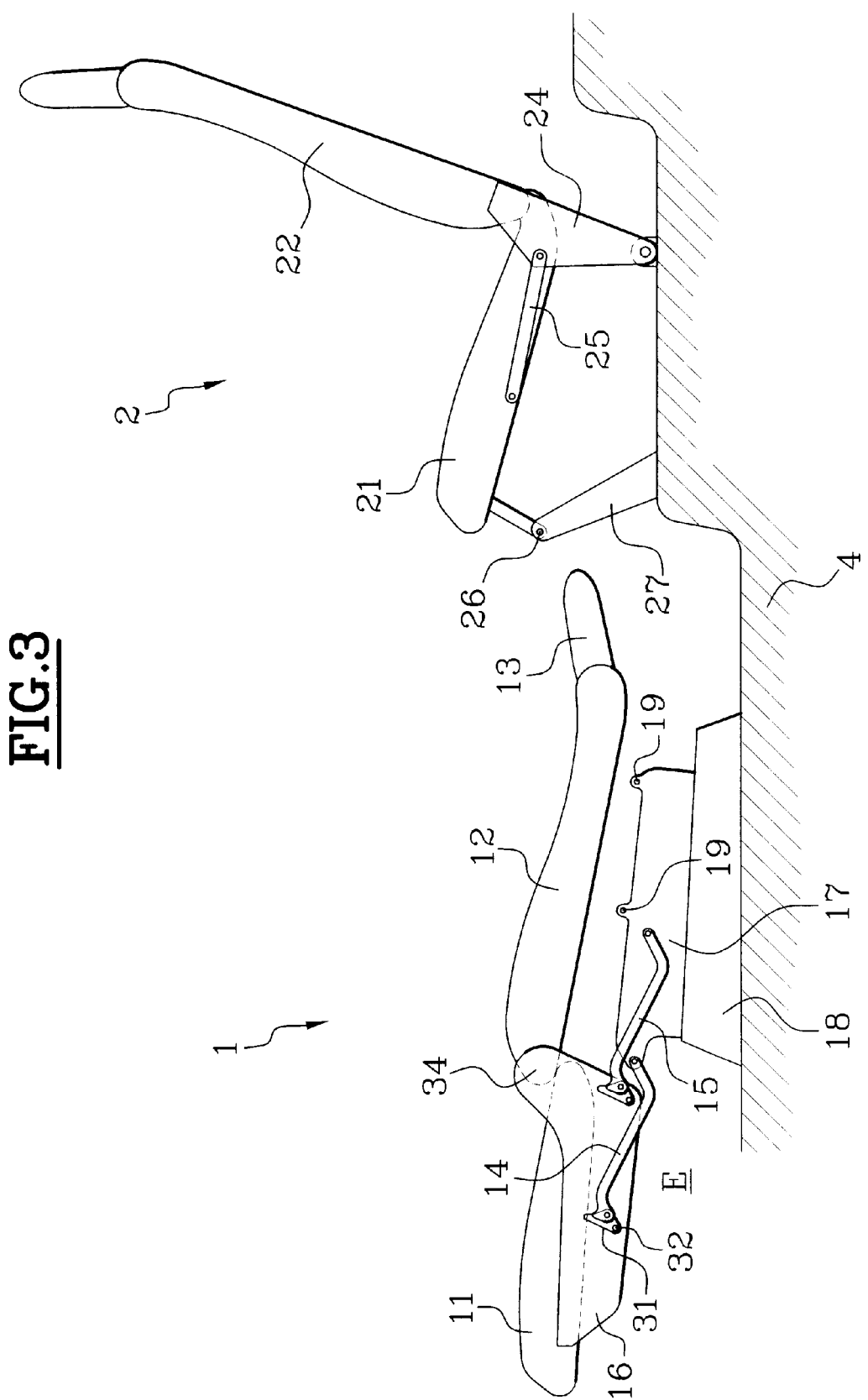

Refer to the appended drawings on which:

FIG. 1 is a schematic view showing the arrangement of the two rows of seats, all seats being in passenger utilisation position, FIG. 2 is a view of the same seats according to a first achievable layout where the seat of the second row is folded and placed against the seat of the first row, FIG. 3 is a view of the same seats in a first modification phase of the layout where the seat pan of the front seat has been placed in a forward position and the backrest folded down towards the rear, FIG. 4 is a view of the same seats in final layout position, where the rear seat is folded up and onto the backrest of the front seat.

The drawing on FIG. 1 shows a front seat, or a seat of row 1, and the rear seat, or a seat of row 2, located behind the said front seat. Of course, each row conventionally includes several seats. Thus, the second row may have three seats abreast. All the seats are fixed, as will be seen later, to the floor 4 of the vehicle.

The front seat 1 includes a seat pan 11 and a backrest 12 equipped with a headrest 13 preferentially retractable. The seat 1 is connected to the floor 4 of the vehicle by a first set of hinged items especially including two arms 14 and 15 which extend more or less parallel and which are hinged, on the one hand, in relation to a framework 16 of the seat pan 11 and, on the other hand, to a base 17, itself connected to the floor by slide means of a known type, symbolised by item 18, to adjust the longitudinal position of the seat.

The arms 14 and 15 are installed hinged by one end on lugs 31 which are themselves hinged, around axes 32, on the framework 16 of the seat pan 11. Arms 14 and 15 are hinged on the base by their other ends, around axes 33. The length and the shape of the arms, and the position of their hinge axes, are determined so that, by pivoting the arms around axes 33, the seat pan follows a trajectory in the form of an arc of a circle, as shown by arrow F on FIG. 1, so as to bring it to the forward position in front of the base 17 as shown on FIG. 3. The pivoting of the lugs 31 has, as can be seen on this figure, an additional seat pan forward movement and lowering effect.

In its normal utilisation position, the rigid connection of the seat pan to the base 17 is ensured by disconnectable anchoring means, of a technology known itself, comprising, for example, anchor fittings 19, attached to the base 17, and which accommodate in a movable and lockable manner, the lower ends of the lugs 31.

The backrest 12 is installed so as to pivot around axis 34 on the framework 16 of the seat pan 11 so that it can be folded down by pivoting towards the rear until it rests on the base 17 when the seat pan is in forward position. The angular position of the backrest can be adjusted and its locking in normal utilization position can be ensured by an adjustable and lockable hinge point. The backrest can also be held in position by disconnectable locking means, symbolically represented by item 20, to lock the top of the backrest on corresponding means 20' attached to the body of the vehicle.

The seat of the second row 2 includes a seat pan 21 and a backrest 22 equipped with a headrest 23. The seat 2 is connected to the floor 4 of the vehicle by a second set of hinged items especially including, at the rear, a rear leg 24 and a pivoting link 25. The backrest 22 is attached rigidly to the leg 24, and the connection to the floor is ensured by anchoring means including, for instance, an anchor fitting 47 attached to the floor and adapted to accommodate, in a removable and lockable manner, the lower end of the leg 24.

At the front, the seat pan is installed so as to pivot around an axis 26 on a rigid seat pan support 27 attached to the floor 4 by means of a lug 28 rigidly connected to the seat pan, this lug being used to move the seat pan forwards when it is pivoted around axis 26, as will be seen later.

The pivoting link 25 is connected to the seat pan by a hinge point 251 and to the leg by a hinge point 252, so as to ensure a rigid connection in the forward-rearward direction between the seat pan 21 and the leg 24 when the seat 2 is in normal utilisation position and so as to automatically move the backrest 22 forwards when the seat pan is pivoted forwards.

The rear 210 of the seat pan 21 is held onto the backrest 22 and onto the leg 24 by lockable and unlockable coupling means, of a type known itself, to prevent relative movement of the rear of the seat pan in relation to the bottom of the backrest in seat normal utilisation position. Simple support means to vertically support the rear of the seat pan would however be sufficient as, by holding the rear of the seat pan against the bottom of the backrest, the seat pan can no longer pivot in relation to the backrest and the anchoring of the leg to the floor ensures that the seat is maintained in position.

The positions of the various hinge and anchoring points and the lengths of the arms and links are determined for each seat so as to allow the various movements which will now be explained in relation with FIGS. 2 to 4.

From the utilisation position of all seats as shown on FIG. 1, the volume of the boot can be increased, according to a first seat layout mode, by disengaging the space occupied by the rear seat by folding the said rear seat 2 against the backrest 12 of the front seat 1. For this, after having released the locking means 30 and 30' at the top of the backrest and unlocked the leg 24 from its anchor fitting 47, the rear 210 of the seat pan is disengaged, by possibly aiding this disengagement by a slight pivoting of the backrest 22 towards the rear, then raised, causing the seat pan to pivot around the axis 26, in the direction shown by arrow F1. The pivoting of the seat pan 21 is necessarily accompanied, due to the connection ensured by the link 25, by a translation movement of the backrest 22 forwards, in direction shown by arrow F2, until the seat pan 21 is in raised position, shown on FIG. 2, against the rear of the backrest of the seat of the first row 12, and the backrest 22 is also in contact with the bottom face of the said seat pan 21. Additional locking means attached to the body, symbolically represented by item 30", are preferentially provided to hold the seat 2 in this position.

To increase the load-carrying volume of the boot still further, the front seat must previously be placed in its forward position shown on FIG. 3. For this, after having released the locking means 20 and 20' of the top of the backrest and unlocked lugs 31 from their anchor fittings 19, the seat pan 11 is raised, causing arms 14 and 15 to pivot around their axes 32, in the direction shown by arrow F, until the seat pan is in the space E existing in front of the seat when it is in normal utilisation position. The translation movement of the seat pan 11 is accompanied at end of travel by a pivoting of the lugs 31 as already explained. Then, the backrest 12 is folded towards the rear until it practically bears on base 17 as can be seen on FIG. 3.

Then, the rear seat 2 is folded onto the backrest of the front seat, from its folded position on FIG. 2, by pivoting in the direction shown by arrow F3 around axis 26.

Note that the rear face 220 of the backrest 22 then lies more or less in the extension of the boot load-carrying floor 49 due to the break in alignment of the floor of the vehicle forming a sort of stairway rising from the first row of seats towards the boot.

Also note that the telescopic headrest 13 of the front seat is pushed into backrest 12 to free space between the front and rear seats in order not to hinder the folding down of the rear seat.

The invention is not limited to the design described above only as an example. In particular, the various hinged items and the hinging and anchoring means can be replaced by all means of known types enabling the displacement kinematics to be ensured in compliance with the description above.

What is claimed is:

1. Modular seat layout system for an automobile vehicle comprising:
   at least two seats located one behind the other, in that a front seat being attached to a floor of the vehicle by a first set of hinged items so that a seat pan of the front seat can be translated towards the front in a forward position to be housed in a space existing in front of the front seat when it is in normal utilization position, and a backrest extends horizontally towards the rear from the seat pan to the location the seat pan occupies during normal utilization, and a rear seat being attached to the floor by a second set of hinged items so that the rear seat can be folded up and placed against the backrest of the front seat.

2. System in accordance with claim 1, wherein the backrest of the front seat pivots in relation to the seat pan and includes disconnectable locking means to connect the top of the backrest of the front seat to a body of the vehicle.

3. System in accordance with claim 1, wherein the second set of hinged items is arranged so that a seat pan of the rear seat can be raised to the vertical by pivoting forward and a backrest of the rear seat can be translated to place it behind the raised seat pan of the rear seat.

4. System in accordance with claim 3, wherein from the position where the backrest of the rear seat is placed behind the raised seat pan of the rear seat, the folded seat assembly is placed against the backrest of the front seat, so that a rear face of the backrest of the rear seat is substantially horizontal.

5. System in accordance with claim 1, wherein the first set of hinged items includes two arms that are hinged and extend substantially parallel in relation to the seat pan and to a base of the seat connected to the floor so as to form with the seat pan and the base a deformable parallelogram.

6. System in accordance with claim 5, wherein the longitudinal position of the base is adjustable in relation to the floor.

7. System in accordance with claim 5, wherein the arms pivot on lugs hinged on a framework of the seat pan and are adapted to lock on anchor fittings attached to the base of the seat.

8. System in accordance with claim 1, wherein a backrest of the rear seat includes disconnectable locking means to connect the top of the backrest of the rear seat to a body of the vehicle.

9. System in accordance with claim 1, wherein the second set of hinged items includes:
   a front seat pan support attached to the floor on which the front of a seat pan of the rear set is hinged,
   a rear leg 24, the upper end of which accommodates a backrest of the rear seat which is attached to the seat pan by a pivoting link hinged to the leg and to the top seat pan in a longitudinal center section of the seat pan.

10. System in accordance with claim 9, characterized in that it includes disconnectable anchoring means to connect in a seperable manner the lower end of the rear leg to the floor of the vehicle.

* * * * *